United States Patent
Gao et al.

(10) Patent No.: US 8,589,916 B2
(45) Date of Patent: Nov. 19, 2013

(54) DEPLOYING AND INSTANTIATING MULTIPLE INSTANCES OF APPLICATIONS IN AUTOMATED DATA CENTERS USING APPLICATION DEPLOYMENT TEMPLATE

(75) Inventors: Jingrong Gao, Richmond Hill (CA); Andrei Oprea, Ajax (CA); C. Razvan Peteanu, North York (CA); Michael George Polan, Markham (CA); Andrew Neil Trossman, North York (CA); Alex Kwok Kee Tsui, Markham (CA)

(73) Assignee: International Business Machines Corporation, Armonk, NY (US)

( * ) Notice: Subject to any disclaimer, the term of this patent is extended or adjusted under 35 U.S.C. 154(b) by 1320 days.

(21) Appl. No.: 12/127,228

(22) Filed: May 27, 2008

(65) Prior Publication Data

US 2008/0256531 A1 Oct. 16, 2008

Related U.S. Application Data

(63) Continuation of application No. 11/117,171, filed on Apr. 28, 2005, now abandoned.

(51) Int. Cl.
*G06F 9/445* (2006.01)

(52) U.S. Cl.
USPC .......................... 717/177; 717/174; 717/176

(58) Field of Classification Search
USPC .................................. 717/174–178
See application file for complete search history.

(56) References Cited

U.S. PATENT DOCUMENTS

| | | | |
|---|---|---|---|
| 4,558,892 A | 12/1985 | Daw et al. | |
| 5,414,812 A | 5/1995 | Filip et al. | |
| 5,466,020 A | 11/1995 | Page et al. | |
| 5,821,937 A | 10/1998 | Tonelli et al. | |
| 5,889,956 A | 3/1999 | Hauser et al. | |
| 5,933,417 A | 8/1999 | Rottoo | |
| 6,003,061 A | 12/1999 | Jones et al. | |
| 6,163,544 A | 12/2000 | Andersson et al. | |
| 6,167,567 A * | 12/2000 | Chiles et al. | 717/173 |

(Continued)

FOREIGN PATENT DOCUMENTS

WO WO03062982 A1 * 7/2003

OTHER PUBLICATIONS

Muller, Nathan J., "Focus on HP OpenView," 1995, CBM Books, p. 163-221.*

(Continued)

*Primary Examiner* — Qing Chen
(74) *Attorney, Agent, or Firm* — Yee & Associates, P.C.; Jeffrey S. LaBaw

(57) ABSTRACT

A method, apparatus, and computer instructions are provided for deploying and instantiating multiple instances of applications in automated data centers using an application deployment template. A first mechanism is provided to deploy multiple instances of applications using an application deployment plan template. The first mechanism uses deployment parameter sets to generate corresponding deployment plans based on the deployment template. A second mechanism is provided to instantiate multiple instances of applications using deployment plan templates. A service catalog that is exposed to consumers for selection of catalog items is built on top of the second mechanism. During the cataloging and order fulfillment process, the second mechanism instantiates multiple instances of applications using the generated deployment plans and an application model to deploy multiple application instances. An existing order may also be modified or terminated responsive to a user request or service term expiration.

18 Claims, 7 Drawing Sheets

(56) References Cited

U.S. PATENT DOCUMENTS

| | | | |
|---|---|---|---|
| 6,259,448 B1* | 7/2001 | McNally et al. | 715/733 |
| 6,272,544 B1 | 8/2001 | Mullen | |
| 6,289,488 B1 | 9/2001 | Dave et al. | |
| 6,336,138 B1 | 1/2002 | Caswell et al. | |
| 6,471,520 B1 | 10/2002 | Herman et al. | |
| 6,628,304 B2 | 9/2003 | Mitchell et al. | |
| 6,678,241 B1 | 1/2004 | Gai et al. | |
| 6,757,298 B1 | 6/2004 | Burns et al. | |
| 6,918,113 B2* | 7/2005 | Patel et al. | 717/178 |
| 6,986,135 B2* | 1/2006 | Leathers et al. | 717/177 |
| 6,996,588 B2* | 2/2006 | Azagury et al. | 1/1 |
| 7,007,980 B2 | 3/2006 | Otsuga et al. | |
| 7,035,930 B2 | 4/2006 | Graupner et al. | |
| 7,036,110 B2 | 4/2006 | Jeyaraman | |
| 7,058,924 B2 | 6/2006 | Greenstein | |
| 7,069,553 B2* | 6/2006 | Narayanaswamy et al. | 717/173 |
| 7,072,807 B2* | 7/2006 | Brown et al. | 703/1 |
| 7,093,005 B2 | 8/2006 | Patterson | |
| 7,097,804 B2 | 8/2006 | Frantz et al. | |
| 7,127,700 B2* | 10/2006 | Large | 717/100 |
| 7,159,037 B1* | 1/2007 | Philyaw et al. | 709/245 |
| 7,181,731 B2 | 2/2007 | Pace et al. | |
| 7,206,817 B2* | 4/2007 | Fanshier et al. | 709/208 |
| 7,209,870 B2 | 4/2007 | Simmons et al. | |
| 7,210,143 B2* | 4/2007 | Or et al. | 717/174 |
| 7,228,326 B2* | 6/2007 | Srinivasan et al. | 709/200 |
| 7,231,430 B2 | 6/2007 | Brownell et al. | |
| 7,243,144 B2 | 7/2007 | Miyake | |
| 7,275,243 B2* | 9/2007 | Gibbons et al. | 717/159 |
| 7,302,400 B2* | 11/2007 | Greenstein | 705/7.12 |
| 7,328,264 B2 | 2/2008 | Babka | |
| 7,340,520 B1* | 3/2008 | Jordan et al. | 709/226 |
| 7,343,601 B2* | 3/2008 | Azagury et al. | 717/176 |
| 7,366,108 B2 | 4/2008 | Szentesi et al. | |
| 7,383,534 B1* | 6/2008 | Agbabian et al. | 717/120 |
| 7,454,488 B2 | 11/2008 | Wechter et al. | |
| 7,478,361 B2 | 1/2009 | Peteanu et al. | |
| 7,519,964 B1* | 4/2009 | Islam et al. | 717/177 |
| 7,526,764 B2* | 4/2009 | Fanshier | 717/174 |
| 7,551,571 B2 | 6/2009 | Goldberg et al. | |
| 7,565,310 B2 | 7/2009 | Gao et al. | |
| 7,631,069 B2 | 12/2009 | Bozak et al. | |
| 7,681,193 B2 | 3/2010 | Oprea et al. | |
| 7,743,127 B2 | 6/2010 | Santos et al. | |
| 7,769,847 B2 | 8/2010 | Lewis | |
| 7,827,283 B2 | 11/2010 | Naik et al. | |
| 7,860,737 B2 | 12/2010 | Jordan et al. | |
| 7,916,662 B2 | 3/2011 | Gao et al. | |
| 7,937,281 B2 | 5/2011 | Miller et al. | |
| 2002/0165864 A1* | 11/2002 | Azagury et al. | 707/10 |
| 2002/0174227 A1 | 11/2002 | Hartsell et al. | |
| 2002/0194045 A1 | 12/2002 | Shay et al. | |
| 2003/0028656 A1 | 2/2003 | Babka | |
| 2003/0034651 A1 | 2/2003 | Neubauer et al. | |
| 2003/0051236 A1* | 3/2003 | Pace et al. | 717/177 |
| 2003/0084156 A1* | 5/2003 | Graupner et al. | 709/226 |
| 2003/0130833 A1 | 7/2003 | Brownell et al. | |
| 2003/0172145 A1 | 9/2003 | Nguyen | |
| 2003/0182459 A1* | 9/2003 | Jeyaraman | 709/310 |
| 2003/0182656 A1* | 9/2003 | Leathers et al. | 717/177 |
| 2003/0192031 A1* | 10/2003 | Srinivasan et al. | 717/120 |
| 2003/0195783 A1* | 10/2003 | Greenstein | 705/8 |
| 2003/0225851 A1* | 12/2003 | Fanshier et al. | 709/208 |
| 2004/0006498 A1 | 1/2004 | Ohtake et al. | |
| 2004/0010437 A1 | 1/2004 | Kiran et al. | |
| 2004/0017783 A1 | 1/2004 | Szentesi et al. | |
| 2004/0050487 A1 | 3/2004 | Frantz et al. | |
| 2004/0059621 A1 | 3/2004 | Jameson | |
| 2004/0064545 A1 | 4/2004 | Miyake | |
| 2004/0073673 A1 | 4/2004 | Santos et al. | |
| 2004/0083287 A1 | 4/2004 | Gao et al. | |
| 2004/0098706 A1* | 5/2004 | Khan et al. | 717/120 |
| 2004/0128176 A1 | 7/2004 | Jordan et al. | |
| 2004/0143954 A1 | 7/2004 | Walsh | |
| 2004/0153533 A1 | 8/2004 | Lewis | |
| 2004/0162749 A1 | 8/2004 | Vogel et al. | |
| 2004/0205206 A1 | 10/2004 | Naik et al. | |
| 2004/0218551 A1 | 11/2004 | Goldberg et al. | |
| 2004/0225952 A1* | 11/2004 | Brown et al. | 714/819 |
| 2004/0264364 A1 | 12/2004 | Sato | |
| 2004/0267897 A1 | 12/2004 | Hill et al. | |
| 2005/0027577 A1 | 2/2005 | Saeed | |
| 2005/0027785 A1 | 2/2005 | Bozak et al. | |
| 2005/0066020 A1 | 3/2005 | Wechter et al. | |
| 2005/0066036 A1 | 3/2005 | Gilmartin | |
| 2005/0120715 A1 | 6/2005 | Labrador | |
| 2005/0138084 A1* | 6/2005 | Azagury et al. | 707/200 |
| 2005/0283759 A1* | 12/2005 | Peteanu et al. | 717/120 |
| 2006/0005162 A1* | 1/2006 | Tseng et al. | 717/107 |
| 2006/0041643 A1* | 2/2006 | Fanshier | 709/220 |
| 2006/0075399 A1* | 4/2006 | Loh et al. | 717/174 |
| 2006/0080412 A1* | 4/2006 | Oprea et al. | 709/220 |
| 2006/0080413 A1 | 4/2006 | Oprea et al. | |
| 2006/0136897 A1* | 6/2006 | Laxminarayan et al. | 717/168 |
| 2006/0200818 A1* | 9/2006 | Oprea et al. | 717/174 |
| 2006/0235732 A1 | 10/2006 | Miller et al. | |
| 2006/0245354 A1 | 11/2006 | Gao et al. | |
| 2006/0250977 A1 | 11/2006 | Gao et al. | |
| 2006/0271928 A1 | 11/2006 | Gao et al. | |
| 2007/0219761 A1 | 9/2007 | Backe et al. | |
| 2007/0236018 A1 | 10/2007 | Husmann et al. | |
| 2009/0292577 A1 | 11/2009 | Gao et al. | |

OTHER PUBLICATIONS

Stamme et al., "Automation Using Tivoli NetView OS/300 V1R3 and System Automation OS/390 V1R3," Mar. 2000, International Technical Support Organization, p. 1-265.*

Peteanu, Razvan, "Best Practivces for Secure Web Development," Sep. 2000, p. 1-25.*

Goscinski et al., "Distributed Ant: A System to Support Application Deployment in the Grid," Nov. 2004, IEEE.*

Lacour et al., "A Network Topology Description Model for Grid Application Deployment," Nov. 2004, IEEE.*

Danelutto, M., "HPC the easy way: new technologies for high performance application development and deployment," 2003, Elsevier, p. 399-419.*

Ambler, "Planning for Deployment—Never Underestimate the Complexity of Launching your Latest System," Dr. Dobb's Portal, http://www.ddj.com/architect/184414753?cid=ambysoft, Jul. 1, 2001, 4 pages.

Johnson et al., "ISDN Deployment—Planning and Building a Corporate Network," IEEE Region 10 Conference on Computer and Communication Systems, Hong Kong, China, Sep. 1990, pp. 851-852.

Office Action regarding U.S. Appl. No. 10/870,227, dated Apr. 22, 2008, 13 pages.

Final Office Action regarding U.S. Appl. No. 10/870,227, dated Aug. 18, 2008, 19 pages.

Office Action regarding U.S. Appl. No. 10/870,227, dated Jan. 16, 2009, 20 pages.

Notice of Allowance regarding U.S. Appl. No. 10/870,227, dated Jul. 27, 2009, 20 pages.

Office Action regarding U.S. Appl. No. 10/870,228, dated Mar. 12, 2007, 18 pages.

Final Office Action regarding U.S. Appl. No. 10/870,228, dated Aug. 29, 2007, 19 pages.

Office Action regarding U.S. Appl. No. 10/870,228, dated Feb. 25, 2008, 17 pages.

Notice of Allowance regarding U.S. Appl. No. 10/870,228, dated Sep. 9, 2008, 22 pages.

Supplemental Notice of Allowability regarding U.S. Appl. No. 10/870,228, dated Oct. 21, 2008, 3 pages.

Office Action regarding U.S. Appl. No. 11/117,171, dated Jun. 27, 2008, 8 pages.

Response to Office Action regarding U.S. Appl. No. 11/117,171, dated Jul. 28, 2008, 13 pages.

Office Action regarding U.S. Appl. No. 11/117,171, dated Nov. 3, 2008, 10 pages.

(56) References Cited

OTHER PUBLICATIONS

Response to Office Action regarding U.S. Appl. No. 11/117,171, dated Jan. 30, 2009, 6 pages.
Notice of Allowance regarding U.S. Appl. No. 11/117,171, dated Apr. 17, 2009, 12 pages.
Office Action regarding U.S. Appl. No. 11/121,421, dated Sep. 10, 2008, 10 pages.
Notice of Allowance regarding U.S. Appl. No. 11/121,421, dated Mar. 18, 2009, 9 pages.
Notice of Allowance regarding U.S. Appl. No. 11/121,533, dated Dec. 16, 2008, 10 pages.
Notice of Allowance regarding U.S. Appl. No. 11/121,533, dated Jun. 2, 2009, 7 pages.
Office Action regarding U.S. Appl. No. 12/538,403, dated Jun. 14, 2010, 20 pages.
Notice of Allowance regarding U.S. Appl. No. 12/538,403, dated Nov. 23, 2010, 13 pages.

\* cited by examiner

FIG. 6A

```xml
<?xml version="1.0" encoding="UTF-8"?>
<deployment-plan-template>       ~600
602~  <routers>
        <router id="router-2229" dcm-router-id="1299" dcm-router-name="Alteon 184
01">
            <route-info-sets>
      604~     <route-info-set name="?-?" id="infoSet-2259">
                    <source-subnet id="subnet-2226" />
                    <dest-subnet id="subnet-2228" />
                    <acl />
                    <properties>
                        <property name="connection_type" value="SOCKET" />
                    </properties>
                </route-info-set>
                <route-info-set name="?-?" id="infoSet-2260">
                    <source-subnet id="subnet-2228" />
                    <dest-subnet id="subnet-2226" />
                    <acl />
                    <properties>
                        <property name="connection_type" value="SOCKET" />
                    </properties>
                </route-info-set>
            </route-info-sets>
            <new-ip-addresses>
                <ip-address id="ip-2231" subnet-id="subnet-2228" />
                <ip-address id="ip-2230" subnet-id="subnet-2226" />
            </new-ip-addresses>
        </router>
    </routers>                                    608              610
606~ <subnets>
        <subnet id="subnet-2226" dcm-subnet-netaddress="?" dcm-subnet-netmask="?"
vlan-id="vlan-2225" admin="false" vlan-no= "49">
            <ip id="ip-2230" defined-on="router" defined-on-id="router-2229"
address="?" />
        </subnet>
        <subnet id="subnet-2228" dcm-subnet-netaddress="?" dcm-subnet-netmask="?"
vlan-id="vlan-2227" admin="false" vlan-no="50">
            <ip id="ip-2231" defined-on="router" defined-on-id="router-2229"
address="?" />
            <ip id="ip-2261" defined-on="load-balancer" defined-on-id="lb-2257"
address="?" />
            <ip id="ip-2262" defined-on="load-balancer" defined-on-id="lb-2257"
address="?" />
        </subnet>
        <subnet id="subnet-774" dcm-subnet-netaddress="0.0.0.0" dcm-subnet-
netmask="0.0.0.0"vlan-id="vlan-775" admin="false" vlan-no="0" />
    </subnets>
```

FIG. 6B

```xml
                                                600
<clusters> /620                                  /
    <cluster name="ST-standalone_server" min-size="1" max-size="1" device-
model="single-server-cluster" managed="true" tier="0" pool-type="existing"
pool="1327" dcm-pool-name="Apache-Redhat" vlan-no="50">
        <logical-clusters>
            <logical-cluster id="logical-cluster-2258" hosted-module-name="test-
java_module-software-stack" hosted-module-id="-123">
                <vip ip="ip-2262" name="ip-2262" first-in-port="0" last-in-port="0"
out-port="0" load-balancing-algorithm="LOAD" subnet-ip="?" subnet-mask="?">
                    <load-balancer id="lb-2257" dcm-id="null" simulated="true">  624
                        <routes />
                    </load-balancer>         622
                </vip>
            </logical-cluster>
        </logical-clusters>
        <server-template name="ST-standalone_server">
            <routes>
                <route realized-through="infoSet-2260" gateway-ip="ip-2231" dest-
subnet="subnet-2226" />
            </routes>                 628
       626   <configured-nics>         /
                <nic vlan-id="vlan-2227" dcm-nic-id="?" vlan-no="50">
                    <network-interface ip="?" subnet-id="subnet-2228">
         630 /      <logical-cluster-enrollments>
                            <enrollment cluster-id="logical-cluster-2258" />
                        </logical-cluster-enrollments>
                    </network-interface>
                </nic>
            </configured-nics>
         632 / <hosting-stack>
                <module name="RedHat9" software-module-id="1181" software-name="?"
software-product-id="1182" />
    634        <module name="Sun JDK1.3 for Linux" software-module-id="1185"
software-name="?" software-product-id="1186" />
                <module name="java_module" software-module-id="-2195" software-
name="test-java_module-software-stack" software-product-id="-123" />
            </hosting-stack>
            <properties />
        </server-template>
        <properties />
    </cluster>
</clusters>
<pools />
<vlans>
    <vlan id="vlan-2225" vlan-no="49" />
    <vlan id="vlan-2227" vlan-no="50" />
    <vlan id="vlan-775" vlan-no="0" />
</vlans>
</deployment-plan-template>
```

DEPLOYING AND INSTANTIATING MULTIPLE INSTANCES OF APPLICATIONS IN AUTOMATED DATA CENTERS USING APPLICATION DEPLOYMENT TEMPLATE

CROSS-REFERENCE TO RELATED APPLICATIONS

This application is a continuation of application Ser. No. 11/117,171, filed Apr. 28, 2005, status abandoned.

BACKGROUND OF THE INVENTION

1. Technical Field

The present invention relates to an improved data processing system. In particular, the present invention relates to deployment of applications in automated data centers. Still more particularly, the present invention relates to deploying and instantiating multiple instances of applications in automated data centers using an application deployment template.

2. Description of Related Art

In a data center, resources and deployment of a distributed application or available service may be represented using a deployment plan. Deployment plans may be translated into operations needed to automatically provision or deploy the defined application or service within the data center. As described in the related patent application entitled "Method and System for Managing Application Deployment", which is incorporated by reference above, a deployment plan may be developed containing an outline of resources and configurations used for deployment based on resource dependency characterization of application to enable deployment, logical characterization, and network characterization of desired deployment.

In particular, as described in the related patent application entitled "Method and System for Establishing a Deployment Plan for an Application", which is incorporated by reference above, a deployment plan describes dependencies between an application's elements and physical and networking components of a deployment. The deployment plan also provides a framework of steps for realizing application deployment within a system for managing deployment of an application. The deployment plan may be established by a user provided logical application structure for an application to be deployed and a chosen application deployment template comprising a logical deployment template and a network topology template. The logical deployment template defines nodes for supporting deployment and the network topology template defines configuration elements for resolving dependencies between nodes.

In existing data center management systems, a deployment plan is used mostly to deploy a single instance of a defined application or service. No existing mechanism is present that deploys multiple instances of an application or a service using the deployment plan.

In addition, no existing mechanism is present that exposes the deployment of applications or services as a catalog item in a service catalog. A service catalog is a collection of services that users may select for deployment. With only the capability of selecting a single application deployment, it is difficult for the user to instantiate more than one application instance.

Therefore, it would be advantageous to have an improved method that deploys multiple instances of applications using an application deployment template and exploits the template to instantiate multiple service instances in automated data centers.

SUMMARY OF THE INVENTION

Embodiments of the present invention provide a first mechanism to deploy multiple instances of an application in a data center. The mechanism first creates a deployment plan template for the application, defines a set of deployment parameters for each instance of the application to be deployed, and associates the deployment plan template with the set of deployment parameters for each instance of the application to be deployed. After association, the mechanism generates a set of deployment plans corresponding to the set of deployment parameters, and deploys multiple instances of the application into the data center.

BRIEF DESCRIPTION OF THE DRAWINGS

The novel features believed characteristic of embodiments of the invention are set forth in the appended claims. Embodiments of the invention itself, however, as well as a preferred mode of use, further objectives and advantages thereof, will best be understood by reference to the following detailed description of an illustrative embodiment when read in conjunction with the accompanying drawings, wherein:

FIG. 6A is a diagram illustrating an exemplary deployment plan template in accordance with an illustrative embodiment of the present invention;

FIG. 6B is a diagram illustrating an exemplary deployment plan template in continuation of FIG. 6A in accordance with an illustrative embodiment of the present invention;

DETAILED DESCRIPTION OF THE PREFERRED EMBODIMENT

Figure 1:
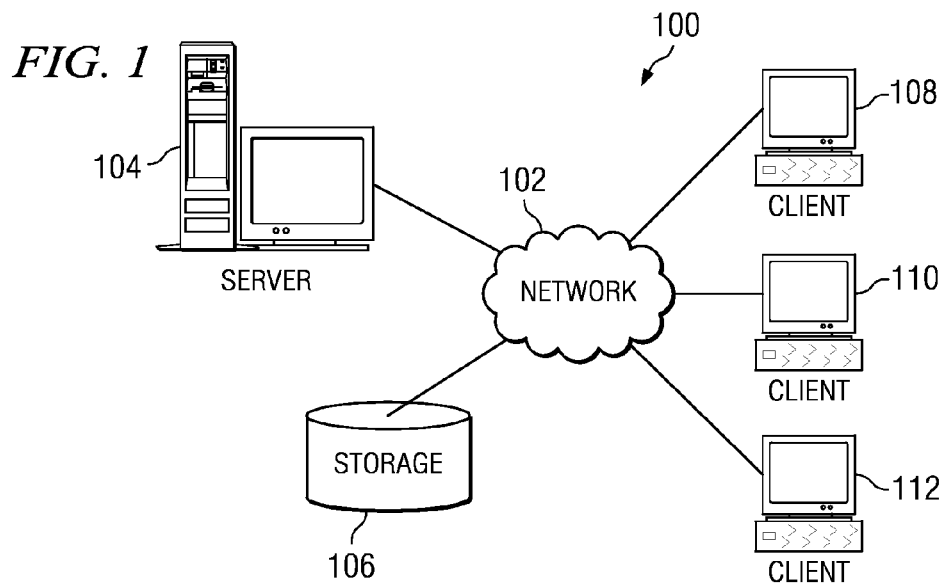
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. Clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational, and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
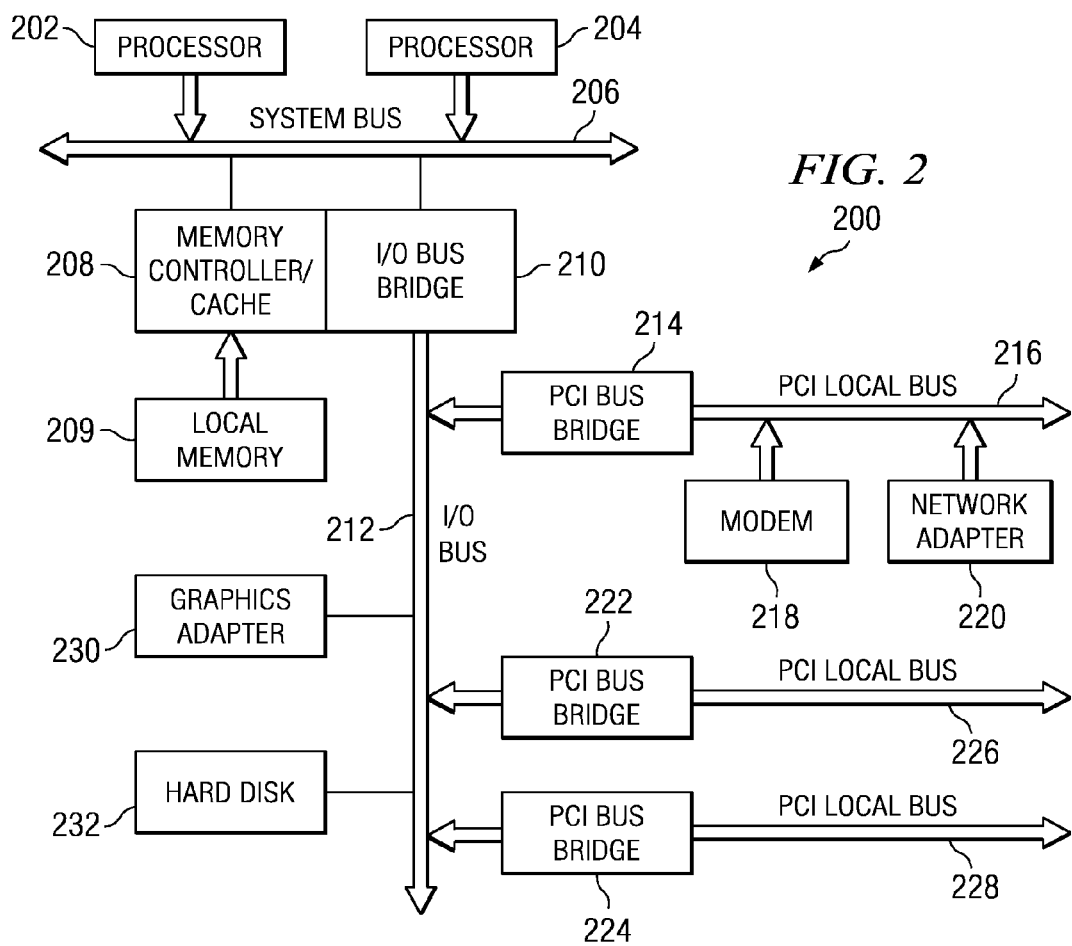
FIG. 2 is a block diagram of a data processing system that may be implemented as a server, in accordance with an illustrative embodiment of the present invention.

Referring to FIG. 2, a block diagram of a data processing system that may be implemented as a server, such as server 104 in FIG. 1, is depicted in accordance with an embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O Bus Bridge 210 is connected to system bus 206 and provides an interface to I/O bus 212. Memory controller/cache 208 and I/O Bus Bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. Memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM® eServer pSeries® system, a product of International Business Machines Corporation in Armonk, N.Y., running the Advanced Interactive Executive (AIX) operating system or the LINUX operating system.

Figure 3:
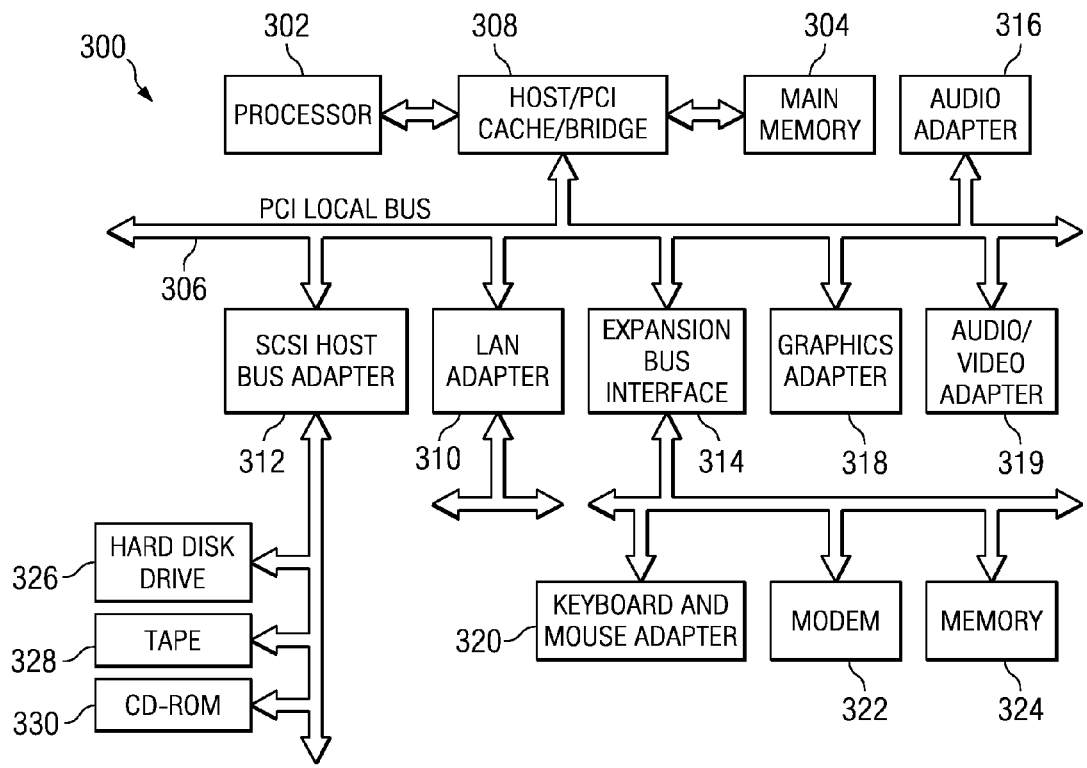
FIG. 3 is a block diagram of a data processing system in which an illustrative embodiment of the present invention may be implemented.

With reference now to FIG. 3, a block diagram illustrating a data processing system is depicted in which an illustrative embodiment of the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI Bridge 308. PCI Bridge 308 also may include an integrated memory controller and cache memory for processor 302. Additional connections to PCI local bus 306 may be made through direct component interconnection or through add-in boards. In the depicted example, local area network (LAN) adapter 310, small computer system interface (SCSI) host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for keyboard and mouse adapter 320, modem 322, and memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object-oriented programming system, such as Java, may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326 and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent non-volatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces. As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand-held computer in addition to taking the form of a PDA. Data processing system 300 also may be a kiosk or a Web appliance.

Figure 4:
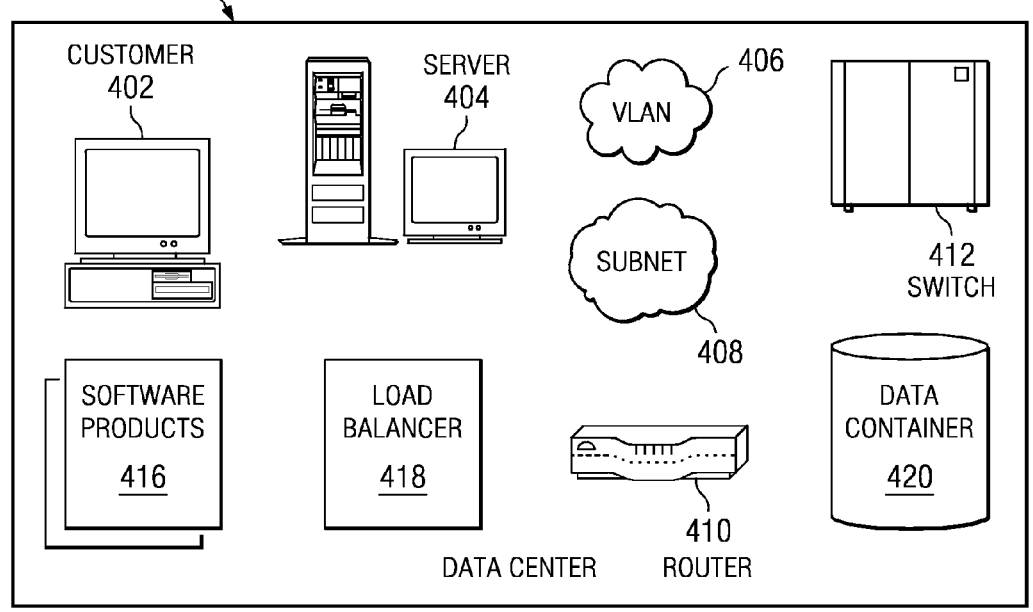
FIG. 4 is a diagram illustrating an exemplary data center, in accordance with an illustrative embodiment of the present invention.

Turning now to FIG. 4, a diagram illustrating an exemplary data center is depicted, in accordance with an embodiment of the present invention. As shown in FIG. 4, in this illustrative example, data center 400 includes resources, such as, customer 402, server 404, Virtual Local Area Network (VLAN)

406, subnet 408, router 410, switch 412, software products 416, load balancer 418, and data container 420.

Customer 402 may be, for example, a client or an administrator who uses a data processing system, such as data processing system 300 in FIG. 3. Server 404 may be implemented as a data processing system, such as data processing system 200 in FIG. 2. Server 404 may also be implemented as an application server, which hosts Web services or other types of servers. Router 410 and switch 412 facilitate communications between different devices. VLAN 406 is a network of computers that behave as if they are connected to the same wire even though they may actually be physically located on different segments of a local area network. Subnet 408 is a portion of a network, which may be a physically independent network segment and shares a network address with other portions of the network.

Software products 416 are applications that may be deployed to a client or a server. Load balancer 418 spreads traffic among multiple systems such that no single system is overwhelmed. Load balancer 418 is normally implemented as software running on a data processing system. Data container 420 may be a database, such as DB2 Universal Database, a product available from International Business Machines Corporation.

Data center 400, as depicted in FIG. 4, is presented for purposes of illustrating the present invention. Other resources, such as, for example, a cluster of servers and switch ports, also may be included in data center 400. The mechanism of the present invention deploys and exploits multiple instances of applications, such as software products 416, using an application deployment template in automated data centers, such as data center 400. The processes of the present invention may be performed by a processing unit, comprising one or more processors, such as processor 302 in FIG. 3, using computer implemented instructions, which may be located in a memory such as, for example, main memory 304, memory 324, or in one or more peripheral devices 326 and 330.

In an illustrative embodiment, the present invention provides a first mechanism that generates and deploys multiple instances of an application using a deployment plan template. For each instance of the application, there are variations in configurations of the application. Examples of application configurations include network configurations, operating systems on which the application runs, and different combinations of software stack that supports the application.

In order to accommodate these variations, a deployment plan template may be used to generate multiple deployment plans based on the different deployment parameters. The deployment plan template is a parameterized deployment plan that has variables corresponding to parameters defined in deployment parameter sets. Some examples of deployment parameters include IP address information, router information, and cluster information.

Figure 5:
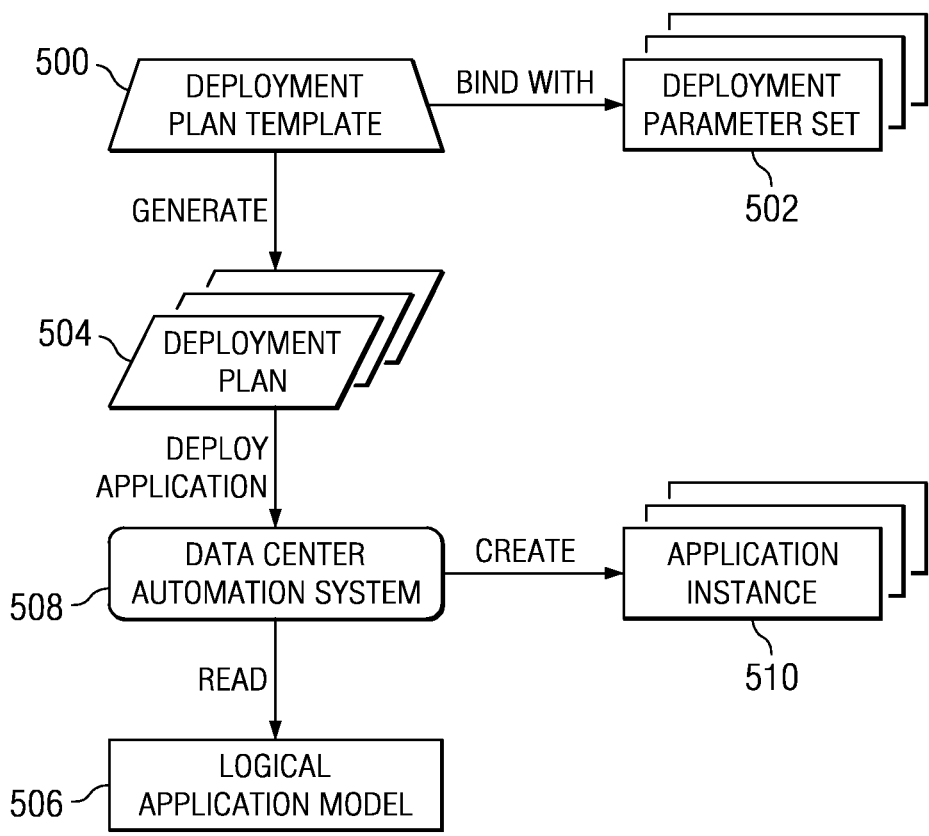
FIG. 5 is a diagram illustrating deployment of multiple instances of applications using an application deployment plan template in accordance with an illustrative embodiment of the present invention.

When binding with different deployment parameter sets, the deployment plan template may be used to generate corresponding deployment plans. With the generated deployment plans, multiple application instances may then be deployed into the data center with the help of a data center automation system. Turning now to FIG. 5, a diagram illustrating deployment of multiple instances of applications using an application deployment plan template is depicted in accordance with an illustrative embodiment of the present invention.

As shown in FIG. 5, deployment plan template 500 is created by the mechanism of the present invention for each application that requires multiple instances. Deployment plan template 500 describes what data center resources are needed and configured, as well as, software modules that need to be installed on the servers. Within deployment plan template 500, variables with unknown values ("?") are present for configurations or resource selections that have to be resolved at runtime. More details regarding deployment plan template 500 are discussed in FIGS. 6A and 6B.

At runtime, deployment parameter set 502 is exposed to the user via a user interface. The user is prompted for resolution of the parameter values in deployment parameter set 502. After the user enters the parameter values, corresponding deployment plan 504 is generated by the mechanism of the present invention based on the parameter set 502. In addition, logical application model 506 is also generated by the mechanism of the present invention to store deployment plan 504.

When the scheduled deployment time arrives, data center automation system 508 retrieves deployment plan 504 that is sufficient to deploy application instance of logical application model 506 to the data center. For each deployment plan, data center automation system 508 creates corresponding application instance 510.

One example of data center automation system 508 is Tivoli Provisioning Management (TPM) System available from International Business Machines Corporation. TPM uses deployment workflows that understand data structures of deployment plan 504 and extract information regarding network configuration, hierarchy, and configuration settings of software modules to be installed on the servers.

With different values for deployment parameters, different sets of application instances may be deployed to the same data center without interfering with each other. Thus, different application instances may be deployed to a different VLAN such that different user groups may have their own instances without accessing other user groups' instances.

Turning now to FIG. 6A, a diagram illustrating an exemplary deployment plan template is depicted in accordance with an illustrative embodiment of the present invention. As shown in FIG. 6A, deployment plan template 600 represents a typical server cluster set up for a Java application running on top of a Linux operating system. In this example implementation, deployment plan template 600 includes configuration settings for routers 602. Within each router in routers 602, route-info-set name 604 parameter value is unknown, represented by "?-?". In addition, deployment plan template includes configuration settings for subnets 606. For each subnet in subnets 606, dcm-subnet-netaddress 608 and dcm-subnet-netmask 610 parameter values are also unknown, represented by "?".

Turning now to FIG. 6B, a diagram illustrating an exemplary deployment plan template in continuation of FIG. 6A is depicted in accordance with an illustrative embodiment of the present invention. As shown in FIG. 6B, deployment plan template 600 also includes configuration settings for clusters 620. For each logical cluster in clusters 620, vip subnet-ip 622 and vip subnet-mask 624 parameter values are unknown. In addition, for each nic in configured-nics 626, dcm-nic-id 628 and network-interface ip 630 parameter values are also unknown. Finally, in hosting-stack 632, software-name 634 for module name "Sun JDK1.3 for Linux" is also unknown.

The unknown values illustrated above are resolved when the final deployment plan is generated. Thus, IP addresses for subnets, configuration of network interface cards for the servers all have to be specified before they can be deployed to the data center.

As described above, in addition to providing a mechanism for deploying multiple instances of applications using a deployment plan template, the present invention provides a second mechanism for instantiating multiple instances of applications. A service catalog that is exposed to consumers for selection of catalog items is built on top of the second mechanism. In particular, the second mechanism of the present invention creates a service catalog entry that represents deployment of multiple instances of a defined service. Thus, each new order received by the order fulfillment system results in the use of the application deployment template to create a unique, separate instance to satisfy the particular subscription.

In the context of the present invention, a service is created to represent an instance of an application based on a deployment plan generated from a deployment plan template. The deployment plan includes information for deploying and undeploying the application. A service catalog is a collection of services with each catalog item defining a service. A user may select a catalog item from the catalog that best suits the user's needs. Once the user selects the catalog item, it becomes an order and the order fulfillment system schedules the application deployment using information from the order by creating a subscription. In an illustrative embodiment, part of the subscription process involves deploying the application instance using the deployment plan generated from the application deployment plan template.

Figure 7:
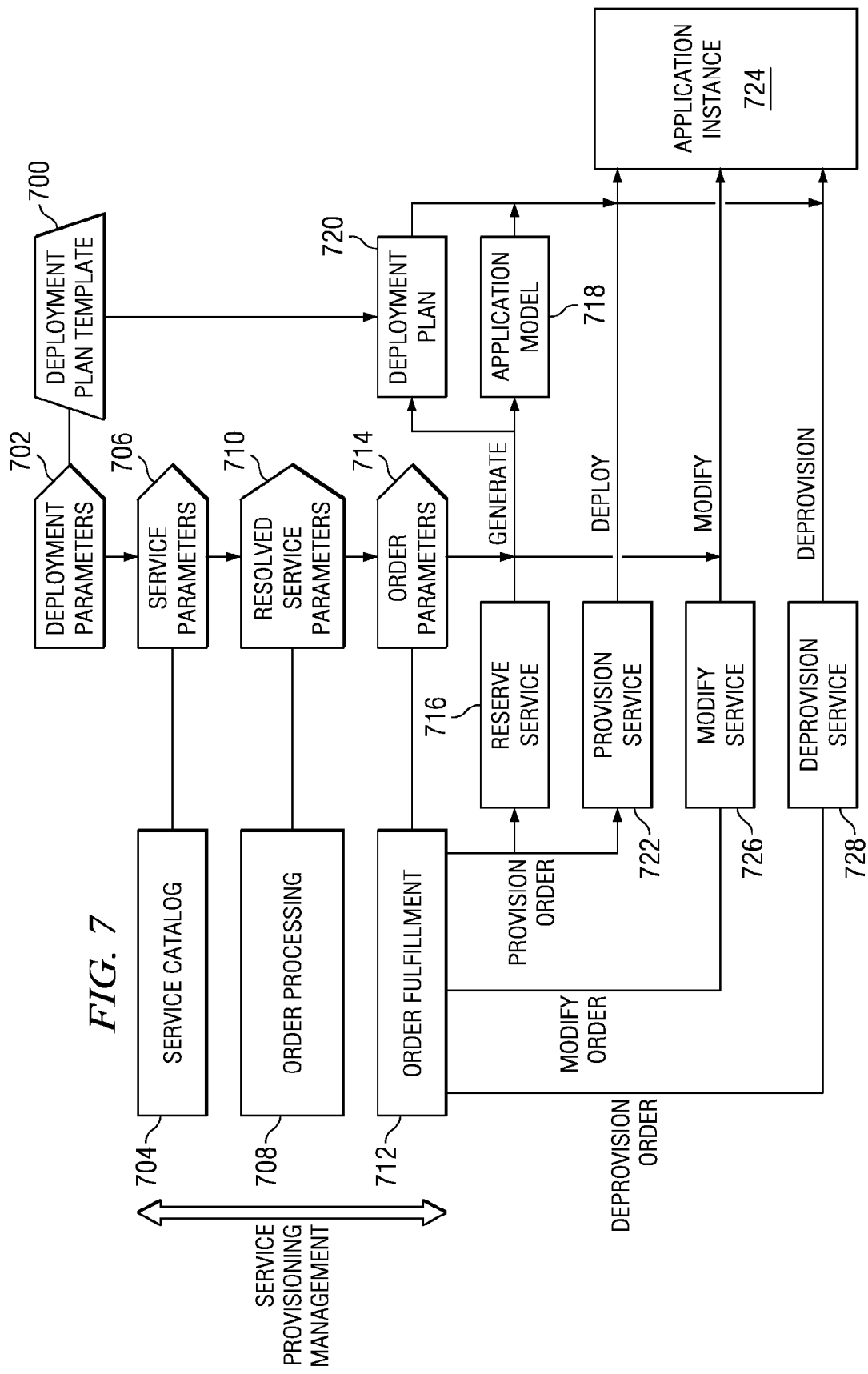
FIG. 7 is a diagram illustrating instantiating multiple instances of applications using an application deployment template in accordance with an illustrative embodiment of the present invention.

Turning now to FIG. 7, a diagram illustrating instantiating multiple instances of applications using an application deployment template is depicted in accordance with an illustrative embodiment of the present invention. As shown in FIG. 7, a catalog entry may be ordered by multiple customers who demand their own instance of the server. To support multiple service instances, deployment plan template 700 is defined for an application.

As discussed previously, using deployment plan template 700, multiple application instances may be deployed. For each instance, deployment parameters 702 associated with deployment plan template 700 is defined. Deployment plan template 700 defines what resources an application requires. These resources include software resources, such as databases, products, middleware, and hardware resources, such as network configurations, servers, and routers, etc. Deployment plan template 700 does not contain complete configuration information.

Therefore, deployment parameters 702 are defined to fill in customized values, for example, a specific IP address for the subnet, and a specific software name for a module, etc.

As the catalog and ordering process continues, deployment parameters 702 are resolved and used for deploying corresponding application instances. In service catalog 704, each catalog item is created by referring to deployment plan template 700. Deployment parameters 702 are inherited as service parameters 706 for the catalog item. In addition, other service parameters may be defined for the purpose of the service, for example, accounting information parameters, rating information parameters, and user information parameters, etc. During the catalog creation process, catalog designer determines some of the parameters that persist across multiple instances of the application. Examples of these parameters include IP addresses, and amount of storage space, etc. Thus, deployment parameters 702 are passed down to service parameters 706 for catalog designers to add more information. The catalog order is then ready for ordering.

When an order is placed for a service catalog item, the value of each of the parameters in service parameters 706 are resolved by the user during order processing 708 to form resolved service parameters 710. A service catalog item represents a item in the service catalog that can be selected by a user. The user completes the order by including user specific information to resolved service parameters 710. After the service parameters are resolved, resolved service parameters 710 are saved along with the order, and based on the selection of deployment parameters 702, an application instance can be distinguished from other instances deployed using the deployment plan template 700.

After the order is processed, it is sent to a service provisioning system for order fulfillment 712. Order fulfillment 712 fulfills the order by reserving data center resources and provisions the service for a new service instance. In order to reserve services 716, order fulfillment 712 creates application model 718 for the service. Application model 718 is a placeholder to hold the actual application to be deployed. By using resolved service parameters 710 saved along with the order as order parameters 714, deployment plan 720 can be generated from deployment plan template 700 for the application. Deployment plan 720 includes values from deployment plan template 700 and order parameters 714 and deployment plan 720 is saved along with application model 718.

When order fulfillment 712 provisions the service 722, the service provisioning system schedules the service as a task to deploy the application at the time specified in the order. When the time arrives, data center automation system deploys a concrete application instance 724, which is generated using information obtained from application model 718 and generated deployment plan 720. Since all deployment parameters 702 in deployment plan 720 are already resolved, data center automation system has sufficient information to successfully deploy application instance 724.

In addition to reserving and provisioning services, order fulfillment 712 allows user to modify service 726 or to enhance currently ordered service. In order to modify the service, another catalog item is created referring to the same service. The user may select additional deployment parameters or use the same deployment parameters with the original order for the new catalog item. Order fulfillment 712 then passes the modified order to the service provisioning system to modify existing application instance 724 using resolved order parameters 714 passed from the modified order.

Furthermore, order fulfillment 712 also deprovisions service 728 by placing an order to the service provisioning system. The order may be manually initiated by a user to terminate the service prematurely or automatically initiated at service end time. In turn, the service provision system invokes data center automation system to undeploy application instance 724 and releases all resources occupied by application instance 724 and restores the resources to the pool. In order to release resources, deployment plan 720 and application model 718 are used by the data center automation system.

Thus, by using deployment plan template 700 and resolved service parameters 710, multiple instances of a service for an application may be provisioned, deprovisioned, and modified. These functionalities are provided via service catalog 704, order processing 708, and order fulfillment 712. In this way, multiple application instances 724 corresponding to multiple deployment plans 720 may be deployed and undeployed in the data center.

Figure 8:
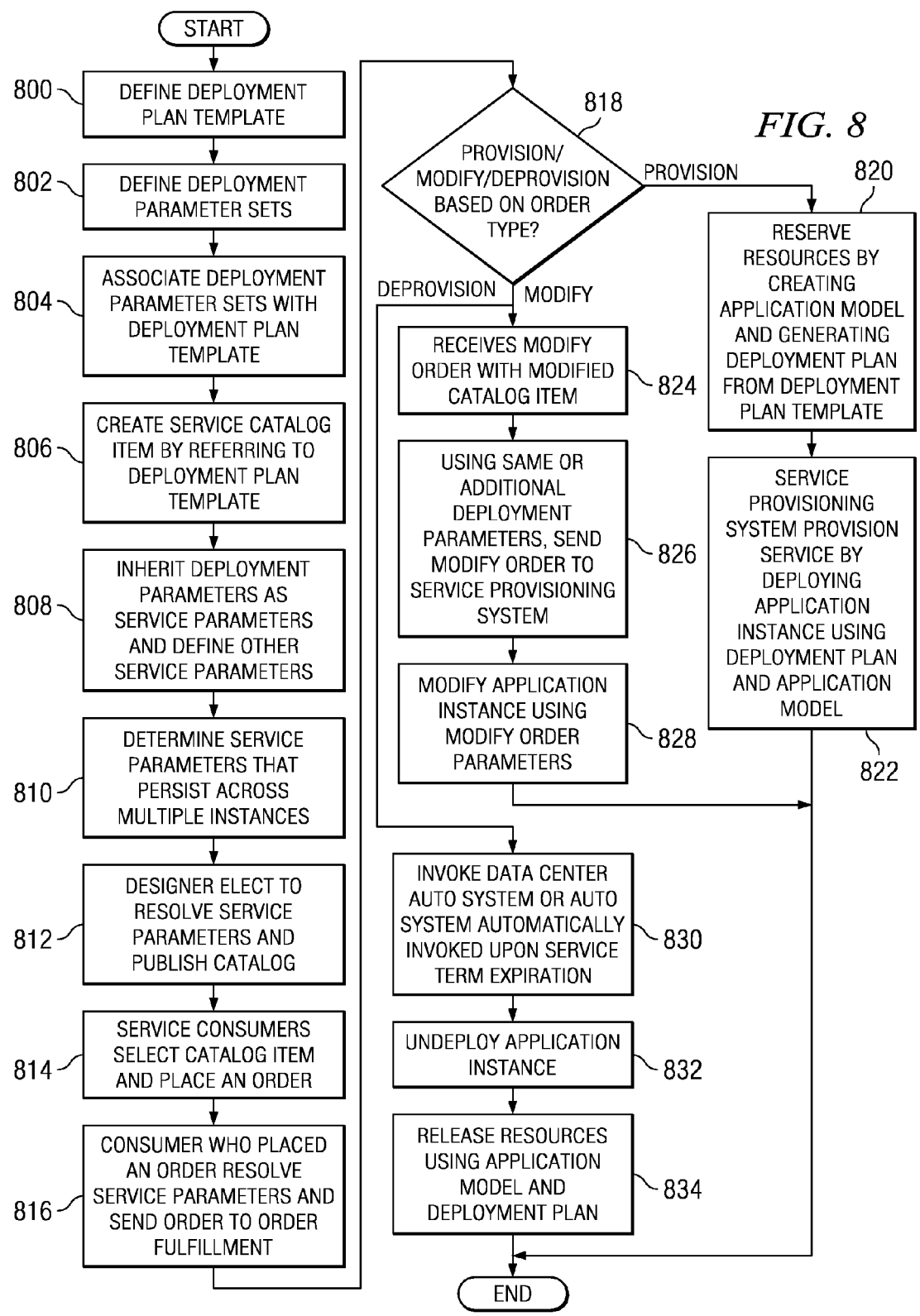
FIG. 8 is a flowchart of an exemplary process for deploying and instantiating multiple instances of applications using a deployment plan template in accordance with an illustrative embodiment of the present invention.

Turning now to FIG. 8, a flowchart of an exemplary process for deploying and instantiating multiple instances of applications using a deployment plan template is depicted in accordance with an illustrative embodiment of the present invention. As depicted in FIG. 8, the process begins when a deployment plan template is defined (step 800). Next, sets of deployment parameters are also defined (step 802). The deployment parameter sets are then associated with the deployment plan template (step 804).

The mechanism of the present invention then creates a service catalog item by referring to the deployment plan template (step 806) and the deployment parameter sets are inherited as service parameters and other service parameters specific for the service are defined at this time (step 808). Service designers may determine service parameters that persist across multiple instances of the application (step 810) and generates an order based on the service parameters. In an illustrative embodiment, the order is generated when service designers elect to resolve service parameters and publish the catalog after resolution (step 812). Service consumers then browse the catalog and select catalog items to place an order (step 814).

During order processing, a user of the service catalog, who may be placing the order, resolves the service parameters and sends the order to order fulfillment system (step 816). Next, the mechanism of the present invention makes a determination as to whether the order is to be provisioned, modified, or deprovisioned based on an order type that is defined in the catalog by the catalog designer (step 818). If the order is to be provisioned, the mechanism of the present inventions first reserves resources by creating an application model and generating a corresponding deployment plan from the deployment plan template (step 820). Service provisioning system then provisions the service by generating and deploying the application instance using information obtained from the deployment plan and the application model (step 822). Thus, the process terminates thereafter.

Turning back to step 818, if the order is to be modified, the mechanism of the present invention receives a modify order initiated from a modified catalog item created by the catalog designer (step 824) and sends the modify order to the service provisioning system using the same or additional deployment parameters with the original order (step 826). For example, a catalog item of email account service may be modified with a catalog item that adds additional storage space to the email account. After the modify order is initiated, the service provisioning system then modifies the existing application instance using the modify order parameters (step 828). Thus, the process terminates thereafter.

Turning back to step 818, if the order is to be deprovisioned, the mechanism of the present invention invokes the data center automation system or the data center automation system is automatically invoked upon service term expiration to generate a cancellation order to deprovision the service at the service end time (step 830). The data center automation system undeploys the application instance (step 832) and releases the resources using the application model and the deployment plan (step 834). Thus, the process terminates thereafter.

Thus, with the application deployment template, multiple instances of applications may be deployed and instantiated for different configurations. In this way, different organizations with different domains may be accommodated.

It is important to note that while the present invention has been described in the context of a fully functioning data processing system, those of ordinary skill in the art will appreciate that the processes of the present invention are capable of being distributed in the form of a computer usable medium of instructions and a variety of forms and that the present invention applies equally regardless of the particular type of signal-bearing media actually used to carry out the distribution. Examples of computer usable media include recordable-type media such as a floppy disc, a hard disk drive, a RAM, and CD-ROMs and transmission-type media such as digital and analog communications links.

The description of embodiments of the present invention have been presented for purposes of illustration and description, but are not intended to be exhaustive or limited to embodiments of the invention in the form disclosed. Many modifications and variations will be apparent to those of ordinary skill in the art. The embodiments were chosen and described in order to best explain the principles of embodiments of the invention, the practical application, and to enable others of ordinary skill in the art to understand the invention for various embodiments with various modifications as are suited to the particular use contemplated.

What is claimed is:

1. A computer implemented method for deploying and instantiating multiple instances of an application in a data center, the computer implemented method comprising:

a computer creating a deployment plan template for the application, wherein the deployment plan template includes configuration settings of the application comprising at least one of: network configurations, operating systems which the application runs on, and combinations of software stack supporting the application, and wherein the deployment plan template includes a set of variables with unknown values for configurations or resource selections that have to be resolved at runtime;

the computer defining a set of deployment parameters for each instance of the application to be deployed, wherein each of the set of deployment parameters includes Internet Protocol (IP) address information, router information, and cluster information for an associated one of the each instance of the application to be deployed;

the computer associating the deployment plan template with the set of deployment parameters for each instance of the application to be deployed;

the computer generating a set of deployment plans, wherein each deployment plan in the set of deployment plans corresponds to the set of deployment parameters for each instance of the application to be deployed; and the computer deploying multiple instances of the application into the data center using the set of deployment plans, wherein each instance of the application is unique.

2. The computer implemented method of claim 1, further comprising:

the computer creating a service catalog item by referring to the deployment plan template;

the computer inheriting the set of deployment parameters as a set of service parameters for the service catalog item;

the computer defining a set of service parameters that is specific to the service catalog item;

the computer defining a set of service parameters that persists across multiple application instances; and the computer placing the service catalog item in a service catalog.

3. The computer implemented method of claim 2, further comprising:

responsive to an order placed by a user for a service catalog item, the computer processing the order by resolving the set of service parameters; and responsive to processing the order, the computer fulfilling the order, wherein the fulfilling step comprises:

the computer reserving resources of the data center; and the computer provisioning a service for the order.

4. The computer implemented method of claim 3, wherein the reserving step comprises:

the computer creating an application model for a service of the service catalog item;

the computer generating a deployment plan from the deployment plan template for the application, wherein the deployment plan is generated using resolved service parameters and order parameters; and the computer saving the generated deployment plan along with the created application model.

5. The computer implemented method of claim 4, wherein the provisioning step comprises:

the computer generating an application instance based on information obtained from the created application model and the generated deployment plan; and the computer deploying the application instance into the data center.

6. The computer implemented method of claim 2, further comprising:

responsive to receiving a modify order comprising a modified service catalog item, the computer modifying an existing service, wherein the modifying step comprises:

the computer modifying an existing application instance using one of a same and additional set of deployment parameters.

7. The computer implemented method of claim 2, further comprising:

responsive to one of a user termination and a service term expiration, the computer deprovisioning a service, wherein the deprovisioning step comprises:

the computer undeploying an existing application instance; and the computer releasing resources occupied by the existing application instance.

8. A data processing system comprising:

a bus;

a memory connected to the bus, wherein a set of instructions are located in the memory; and a processing unit connected to the bus, wherein the processing unit executes the set of instructions to create a deployment plan template for an application, wherein the deployment plan template includes configuration settings of the application comprising at least one of: network configurations, operating systems which the application runs on, and combinations of software stack supporting the application, and wherein the deployment plan template includes a set of variables with unknown values for configurations or resource selections that have to be resolved at runtime; define a set of deployment parameters for each instance of the application to be deployed, wherein each of the set of deployment parameters includes Internet Protocol (IP) address information, router information, and cluster information for an associated one of the each instance of the application to be deployed; associate the deployment plan template with the set of deployment parameters for each instance of the application to be deployed; generate a set of deployment plans, wherein each deployment plan in the set of deployment plans corresponds to the set of deployment parameters for each instance of the application to be deployed; and deploy multiple instances of the application into a data center using the set of deployment plans, wherein each instance of the application is unique.

9. The data processing system of claim 8, wherein the processing unit further executes the set of instructions to create a service catalog item by referring to the deployment plan template; inherit the set of deployment parameters as a set of service parameters for the service catalog item; define a set of service parameters that is specific to the service catalog item; define a set of service parameters that persists across multiple application instances; and place the service catalog item in a service catalog.

10. The data processing system of claim 9, wherein the processing unit further executes the set of instructions to process an order by resolving the set of service parameters responsive to the order placed by a user for a service catalog item; and fulfill the order responsive to processing the order, wherein the processing unit, in executing the set of instructions to fulfill the order, reserves resources of the data center, and provisions a service for the order.

11. The data processing system of claim 9, wherein the processing unit further executes the set of instructions to modify an existing service responsive to receiving a modify order comprising a modified service catalog item, wherein the processing unit, in executing the set of instructions to modify the existing service, modifies an existing application instance using one of a same and an additional set of deployment parameters.

12. The data processing system of claim 9, wherein the processing unit further executes the set of instructions to deprovision a service responsive to one of a user termination and a service term expiration, wherein the processing unit, in executing the set of instructions to deprovision a service, undeploys an existing application instance, and releases resources occupied by the existing application instance.

13. A computer program product embodied in a computer readable recording medium for deploying and instantiating multiple instances of an application in a data center, the computer program product comprising:

first instructions configured to create a deployment plan template for the application, wherein the deployment plan template includes configuration settings of the application comprising at least one of: network configurations, operating systems which the application runs on, and combinations of software stack supporting the application, and wherein the deployment plan template includes a set of variables with unknown values for configurations or resource selections that have to be resolved at runtime;

second instructions configured to define a set of deployment parameters for each instance of the application to be deployed, wherein each of the set of deployment parameters includes Internet Protocol (IP) address information, router information, and cluster information for an associated one of the each instance of the application to be deployed;

third instructions configured to associate the deployment plan template with the set of deployment parameters for each instance of the application to be deployed;

fourth instructions configured to generate a set of deployment plans, wherein each deployment plan in the set of deployment plans corresponds to the set of deployment parameters for each instance of the application to be deployed; and fifth instructions configured to deploy multiple instances of the application into the data center using the set of deployment plans, wherein each instance of the application is unique, and wherein the computer readable recording medium does not consist of transitory, propagating signals.

14. The computer program product of claim 13, further comprising:

sixth instructions configured to create a service catalog item by referring to the deployment plan template;

seventh instructions configured to inherit the set of deployment parameters as a set of service parameters for the service catalog item;

eighth instructions configured to define a set of service parameters that is specific to the service catalog item;

ninth instructions configured to define a set of service parameters that persist across multiple application instances; and tenth instructions configured to place the service catalog item in a service catalog.

15. The computer program product of claim 14, further comprising:

eleventh instructions configured to process an order by resolving the set of service parameters responsive to the order placed by a user for a service catalog item; and twelfth instructions configured to fulfill the order responsive to processing the order, wherein the twelfth instructions comprise:

first sub-instructions configured to reserve resources of the data center; and second sub-instructions configured to provision a service for the order.

16. The computer program product of claim 14, further comprising:

eleventh instructions configured to modify an existing service responsive to receiving a modify order comprising a modified service catalog item, wherein the eleventh instructions comprise:

sub-instructions configured to modify an existing application instance using one of a same and an additional set of deployment parameters.

17. The computer program product of claim 14, further comprising:

eleventh instructions configured to deprovision a service responsive to one of a user termination and a service term expiration, wherein the eleventh instructions comprise:

first sub-instructions configured to undeploy an existing application instance; and second sub-instructions configured to release resources occupied by the existing application instance.

18. A computer implemented method for deploying and instantiating multiple instances of an application in a data center, the computer implemented method comprising:

a computer creating a deployment plan template for the application, wherein the deployment plan template includes configuration settings of the application, and wherein the configuration settings include at least one of network configurations, operating systems which the application runs on, and combinations of software stack supporting the application;

the computer defining a set of deployment parameters for each instance of the application to be deployed;

the computer associating the deployment plan template with the set of deployment parameters for each instance of the application to be deployed;

the computer generating a set of deployment plans, wherein each deployment plan in the set of deployment plans corresponds to the set of deployment parameters for each instance of the application to be deployed;

the computer deploying multiple instances of the application into the data center using the set of deployment plans, wherein each instance of the application is unique;

the computer creating a service catalog item by referring to the deployment plan template;

the computer inheriting the set of deployment parameters as a set of service parameters for the service catalog item;

the computer defining a set of service parameters that is specific to the service catalog item;

the computer defining a set of service parameters that persists across multiple application instances;

the computer placing the service catalog item in a service catalog;

responsive to an order placed by a user for a service catalog item, the computer processing the order by resolving the set of service parameters;

responsive to processing the order, the computer creating an application model for a service of the service catalog item, generating a deployment plan from the deployment plan template for the application, wherein the deployment plan is generated using resolved service parameters and order parameters, and saving the generated deployment plan along with the created application model;

further responsive to processing the order, the computer generating an application instance based on information obtained from the created application model and the generated deployment plan, and deploying the application instance into the data center;

responsive to receiving a modify order comprising a modified service catalog item, the computer modifying an existing application instance using one of a same and additional set of deployment parameters; and responsive to one of a user termination and a service term expiration, the computer undeploying an existing application instance, and releasing resources occupied by the existing application instance.

* * * * *